(12) United States Patent
Bryant et al.

(10) Patent No.: US 8,412,899 B2
(45) Date of Patent: Apr. 2, 2013

(54) REAL TIME BACKUP STORAGE NODE ASSIGNMENT

(75) Inventors: Michael S. Bryant, Bellingham, MA (US); Joseph Ficara, Shrewsbury, MA (US); Michael Robert Boucher, Shrewsbury, MA (US)

(73) Assignee: Autonomy, Inc., San Francisco, CA (US)

( * ) Notice: Subject to any disclaimer, the term of this patent is extended or adjusted under 35 U.S.C. 154(b) by 227 days.

(21) Appl. No.: 12/790,033

(22) Filed: May 28, 2010

(65) Prior Publication Data

US 2011/0246735 A1 Oct. 6, 2011

Related U.S. Application Data

(60) Provisional application No. 61/320,051, filed on Apr. 1, 2010.

(51) Int. Cl.
*G06F 12/00* (2006.01)

(52) U.S. Cl. ........................................................ 711/162

(58) Field of Classification Search .................. None
See application file for complete search history.

(56) References Cited

U.S. PATENT DOCUMENTS

| | | | |
|---|---|---|---|
| 5,581,689 A | 12/1996 | Slominski et al. | |
| 6,016,553 A | 1/2000 | Schneider et al. | |
| 6,199,178 B1 | 3/2001 | Schneider et al. | |
| 6,240,527 B1 | 5/2001 | Schneider et al. | |
| 6,629,264 B1 | 9/2003 | Sicola et al. | |
| 6,643,795 B1 | 11/2003 | Sicola et al. | |
| 7,058,848 B2 | 6/2006 | Sicola et al. | |
| 7,269,646 B2 * | 9/2007 | Yamamoto et al. | 709/223 |
| 8,117,169 B2 * | 2/2012 | Derk et al. | 707/652 |
| 2002/0049883 A1 | 4/2002 | Schneider et al. | |
| 2003/0084076 A1 | 5/2003 | Sekiguchi et al. | |
| 2004/0064639 A1 | 4/2004 | Sicola et al. | |
| 2007/0022121 A1 | 1/2007 | Bahar et al. | |
| 2007/0220320 A1 | 9/2007 | Sen et al. | |

FOREIGN PATENT DOCUMENTS

| | | |
|---|---|---|
| EP | 1522926 A2 | 4/2005 |
| JP | 2003140930 A | 5/2003 |
| JP | 2004206611 A | 7/2004 |
| JP | 2005122611 | 5/2005 |
| JP | 2005275526 | 10/2005 |
| JP | 2005538470 | 12/2005 |
| JP | 2007140746 | 6/2007 |
| WO | 2004025470 A1 | 3/2004 |
| WO | 2009149451 A2 | 12/2009 |

OTHER PUBLICATIONS

"Search Report on Japan Patent Application No. 2011-070097", Japan Patent Office, Nov. 29, 2012, 8 pages.

* cited by examiner

*Primary Examiner* — Brian Peugh

(57) ABSTRACT

A method of assigning a storage node from a storage grid to a server is presented. The storage grid includes multiple storage nodes capable of backing up a policy stored on the server. The method includes receiving an assignment request which requests assignment of one of the multiple storage nodes of the storage grid to the server to backup the policy stored on the server. The method also includes performing a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid. The method further includes notifying the server of the assignment result to effectuate backing up of the policy stored on the server by the storage node.

20 Claims, 5 Drawing Sheets

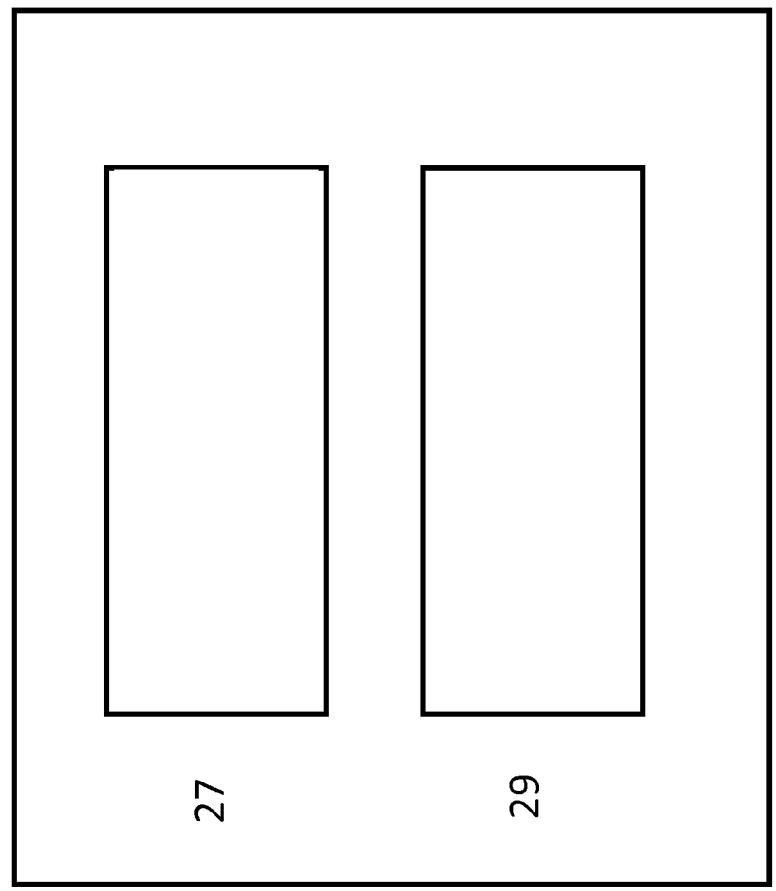
Figure 2

| ID | Backup policies | Continuous | Versions | Further backup? | Total/ Avail. Capacity | Replication disabled? | Node disabled? | Anticipated storage |
|---|---|---|---|---|---|---|---|---|
| 1 | 10 | 100% | 1000 | Y | 50/10 | Y | N | 5 |
| 2 | 25 | 20% | 2000 | N | 20/2 | Y | Y | 0 |
| 3 | 5 | 100% | 500 | Y | 10/5 | N | N | 3 |
| 4 | 10 | 0% | 500 | Y | 70/60 | Y | N | 20 |

Figure 3

| Best-Fit Value | State | Description |
|---|---|---|
| 0x001 | BackupPolicyCountViolation | # of policies is in excess |
| 0x002 | ContinuousPolicyPercentageViolation | % of continuous policies is in excess |
| 0x04 | NoViolation | No violation |
| 0x08 | SpaceViolation | Not enough space |
| 0x10 | ReplicationDisabledViolation | Replication disabled |
| 0x20 | DisabledVaultViolation | Vault disabled |
| 0x40 | TargetOfAMove | Target of a move |
| 0x80 | VersionCountViolation | # of versions is in excess |
| 0x100 | NoSpaceAvailableViolation | No available space |
| 0x200 | NoPrimaryVaultViolation | No vault available |

Figure 4

REAL TIME BACKUP STORAGE NODE ASSIGNMENT

CROSS REFERENCE TO RELATED APPLICATIONS

This patent application is a Utility application claiming the benefit of U.S. Provisional Application No. 61/320,051 filed on Apr. 1, 2010, entitled, "REAL TIME BACKUP STORAGE NODE ASSIGNMENT", the contents and teachings of which are hereby incorporated by reference in their entirety.

BACKGROUND

A policy refers to a collection of disk files. A policy may also specify, among other things, folders and/or files residing on a server to be protected.

It is common practice to back up policies stored on servers to storage vaults. Typically, such vaults are located remotely from the server storing the policy to be backed up. Further, there are typically multiple vaults from which to choose for the backup.

A simple way to choose a storage node for backing up a policy is to randomly assign the node. For example, a system administrator may have a list of storage vaults from which to choose, and arbitrarily chooses a vault from the list.

SUMMARY

The random assignment of storage vaults does not facilitate an optimal utilization of storage capacity. Presently, vaults are limited to approximately 60%-65% of its capacity to leave enough space for backup data growth and enough space to perform replication and rotation. It is desired to push this capacity as close as possible to 80% to maximize the usage of the existing vaults.

At the same time, other considerations beside raw storage space need to be taken into account in order to control the load placed on the vaults. For example, an "optimal" vault would be filled to approximately 80% capacity, would have less than 200,000 versions stored on it, would have less than 200 backup policies on it, and less than 50% of the policies on the vault would have a continuous schedule, i.e., every 15 minutes.

In contrast to the above-described conventional random assignment of storage vaults, a technique of assigning a storage node from a storage grid to a server is presented as an embodiment of a solution to the problem of using storage resources more efficiently. The storage grid includes multiple storage nodes capable of backing up a policy stored on the server. The technique involves receiving an assignment request which requests assignment of one of the multiple storage nodes of the storage grid to the server to backup the policy stored on the server. The technique further involves performing a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid. The technique further involves notifying the server of the assignment result to effectuate backing up of the policy stored on the server by the storage node.

By making the provisioning process more intelligent, existing vault space can be optimized for small to mid range backup policies, and allow newer vaults to accept larger backup policies.

Implementations are directed to the following.

Performing the storage node assignment operation in the automated manner in response to the assignment request can include performing a comparison of the storage space requirements of the policy with available storage space resources of a particular storage node to generate the assessment of storage space requirements of the policy and available storage space resources of the storage grid.

The storage space requirements of the policy can include a current amount of storage space currently occupied by the policy on the server. In this case, the available storage space resources of the particular storage node would include a current amount of free storage space currently available on the particular storage node. Also, comparing the storage space requirements of the policy with available storage space resources of the particular storage node would include (i) multiplying the current amount of storage space currently occupied by the policy on the server by a growth rate factor to generate a future amount of storage space projected to be occupied by the policy on the server at a future point in time, and (ii) comparing the future amount of storage space projected to be occupied by the policy on the server to the current amount of free storage space currently available on the particular storage node to determine whether to assign the particular storage node to backup the policy stored on the server.

The storage space requirements of the policy can include a total amount of storage space currently available to the policy on the server. In this case, the available storage space resources of the particular storage node would include a current amount of free storage space currently available on the particular storage node and a current amount of allocated storage space on the particular storage node. Also, comparing the storage space requirements of the policy with available storage space resources of the particular storage node would include (i) subtracting the current amount of allocated storage space on the particular storage node from the current amount of free storage space currently available on the particular storage node to provide an amount of non-allocated storage space on the particular storage node, and (ii) comparing the total amount of storage space currently available to the policy on the server with the amount of non-allocated storage space on the particular storage node to determine whether to assign the particular storage node to backup the policy stored on the server.

The storage space requirements of the policy can further include a backup frequency. In this case, the available storage space resources of the particular storage node would further include a current number of versions associated with the particular storage node. Also, comparing the storage space requirements of the policy with available storage space resources of the particular storage node would further include (i) increasing the current number of versions by a particular number of versions based on the backup frequency to provide a potential number of versions, and (ii) comparing the potential number of versions to a predefined maximum number of versions permitted for the particular storage node to determine whether to assign the particular storage node to backup the policy stored on the server.

The storage space requirements of the policy can further include a backup type setting, the backup type setting identifying one of a "continuous" backup type in which a policy backup operation is to be performed every 15 minutes and a "scheduled" backup type in which a policy backup operation is to be performed at user-specified intervals. In this case, the available storage space resources of the particular storage node would further include a current number of "continuous" backup type policies assigned to the storage node. Also, comparing the storage space requirements of the policy with available storage space resources of the particular storage node would further include, only when the backup type setting identifies the "continuous" backup type, (i) incrementing the current number of "continuous" backup type policies currently assigned to the particular storage node to provide a potential number "continuous" backup type policies assigned to the particular storage node, and (ii) comparing the potential number of "continuous" backup type policies assigned to the storage node to a predefined maximum number of "continuous" backup type policies permitted for the particular storage node to determine whether to assign the particular storage node to backup the policy stored on the server.

The storage space requirements of the policy can further include a load balance setting, the load balance setting identifying whether multiple policies on the server are permitted to be backed up to a same storage node. In this case, comparing the storage space requirements of the policy with available storage space resources of the particular storage node would further include, when the load balance setting identifies that multiple policies on the server are not permitted to be backed up to the same storage node, detecting whether the particular storage node is already assigned to backup another policy stored on the server to determine whether to assign the particular storage node to backup the policy stored on the server.

In the context of a method embodiment, the method can further include, prior to comparing the storage space requirements of the policy with the available storage space resources of the particular storage node, setting the growth rate factor to be a value which increases the current amount of storage space currently occupied by the policy on the server by a predefined percentage to provide the future amount of storage space projected to be occupied by the policy on the server at the future point in time.

The method can further include, after assigning the particular storage node to backup the policy stored on the server, adjusting the available storage space resources of the particular storage node to account for assignment of the particular storage node to backup the policy stored on the server.

The method can further include, prior to receiving the assignment request, establishing a storage grid database which stores storage node entries, each storage node entry (i) corresponding to a storage node of the storage grid, (ii) identifying currently available storage space resources for that storage node, and (iii) imposing assignment restrictions for that storage node. In this case, the method would further include dynamically updating the storage node entries of the storage grid database to account for new storage node assignments.

A further embodiment to the stated problem is an electronic apparatus to assign a storage node from a storage grid to a server. The storage grid includes multiple storage nodes capable of backing up a policy stored on the server. The electronic apparatus includes a network interface. The electronic apparatus also includes a control circuit coupled to the network interface. The control circuit is constructed and arranged to receive, through the network interface, an assignment request which requests assignment of one of the multiple storage nodes of the storage grid to the server to backup the policy stored on the server. The control circuit is also constructed and arranged to perform a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid. The control circuit is further constructed and arranged to notify the server, through the network interface, of the assignment result to effectuate backing up of the policy stored on the server by the storage node.

Implementations are directed to the following.

The control circuit, when performing the storage node assignment operation in the automated manner in response to the assignment request, can be constructed and arranged to perform a comparison of the storage space requirements of the policy with available storage space resources of a particular storage node to generate the assessment of storage space requirements of the policy and available storage space resources of the storage grid.

The storage space requirements of the policy can include a total amount of storage space currently available to the policy on the server. In this case, the available storage space resources of the particular storage node would include a current amount of free storage space currently available on the particular storage node and a current amount of allocated storage space on the particular storage node. Also, comparing the storage space requirements of the policy with available storage space resources of the particular storage node would include (i) subtracting the current amount of allocated storage space on the particular storage node from the current amount of free storage space currently available on the particular storage node to provide an amount of non-allocated storage space on the particular storage node, and (ii) comparing the total amount of storage space currently available to the policy on the server with the amount of non-allocated storage space on the particular storage node to determine whether to assign the particular storage node to backup the policy stored on the server.

The storage space requirements of the policy can include a current amount of storage space currently occupied by the policy on the server. In this case, the available storage space resources of the particular storage node would include a current amount of free storage space currently available on the particular storage node. Also, comparing the storage space requirements of the policy with available storage space resources of the particular storage node would include (i) multiplying the current amount of storage space currently occupied by the policy on the server by a growth rate factor to generate a future amount of storage space projected to be occupied by the policy on the server at a future point in time, and (ii) comparing the future amount of storage space projected to be occupied by the policy on the server to the current amount of free storage space currently available on the particular storage node to determine whether to assign the particular storage node to backup the policy stored on the server.

The control circuit can be constructed and arranged to, after assigning the particular storage node to backup the policy stored on the server, adjust the available storage space resources of the particular storage node to account for assignment of the particular storage node to backup the policy stored on the server.

A further embodiment to the stated problem is computer program product which includes code which, when executed by a computer, causes the computer to assign a storage node from a storage grid to a server. The storage grid includes multiple storage nodes capable of backing up a policy stored on the server. The code includes instructions to receive, through the network interface, an assignment request which requests assignment of one of the multiple storage nodes of the storage grid to the server to backup the policy stored on the server. The code also includes instructions to perform a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid. The code further includes instructions to notify the server, through the network interface, of the assignment result to effectuate backing up of the policy stored on the server by the storage node.

Implementations are directed to the following.

The instructions to perform the storage node assignment operation in the automated manner in response to the assignment request can include instructions to perform a comparison of the storage space requirements of the policy with available storage space resources of a particular storage node to generate the assessment of storage space requirements of the policy and available storage space resources of the storage grid.

The storage space requirements of the policy can include a total amount of storage space currently available to the policy on the server. In this case, the available storage space resources of the particular storage node would include a current amount of free storage space currently available on the particular storage node and a current amount of allocated storage space on the particular storage node. Also, comparing the storage space requirements of the policy with available storage space resources of the particular storage node would include (i) subtracting the current amount of allocated storage space on the particular storage node from the current amount of free storage space currently available on the particular storage node to provide an amount of non-allocated storage space on the particular storage node, and (ii) comparing the total amount of storage space currently available to the policy on the server with the amount of non-allocated storage space on the particular storage node to determine whether to assign the particular storage node to backup the policy stored on the server.

The storage space requirements of the policy can include a current amount of storage space currently occupied by the policy on the server. In this case, the available storage space resources of the particular storage node would include a current amount of free storage space currently available on the particular storage node. Also, comparing the storage space requirements of the policy with available storage space resources of the particular storage node would include (i) multiplying the current amount of storage space currently occupied by the policy on the server by a growth rate factor to generate a future amount of storage space projected to be occupied by the policy on the server at a future point in time, and (ii) comparing the future amount of storage space projected to be occupied by the policy on the server to the current amount of free storage space currently available on the particular storage node to determine whether to assign the particular storage node to backup the policy stored on the server.

The code can further include instructions to adjust the available storage space resources of the particular storage node to account for assignment of the particular storage node to backup the policy stored on the server after the particular storage node is assigned to backup the policy stored on the server.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2 is a block diagram of a provider apparatus.

FIG. 3 is a block diagram of a database.

FIG. 4 is a block diagram of a table containing an assessment scheme for assigning a storage node to a policy.

DETAILED DESCRIPTION

An improved technique smartly assigns, for backing up a policy (e.g., a collection of files) of a server (i.e., agent), a storage node to the agent based on information from the agent and information from a storage grid of available storage nodes. Such a technique preferably uses real time information and enables greater flexibility in distributing storage load across the storage grid as well as better bandwidth utilization during backups and/or restores.

Figure 1:
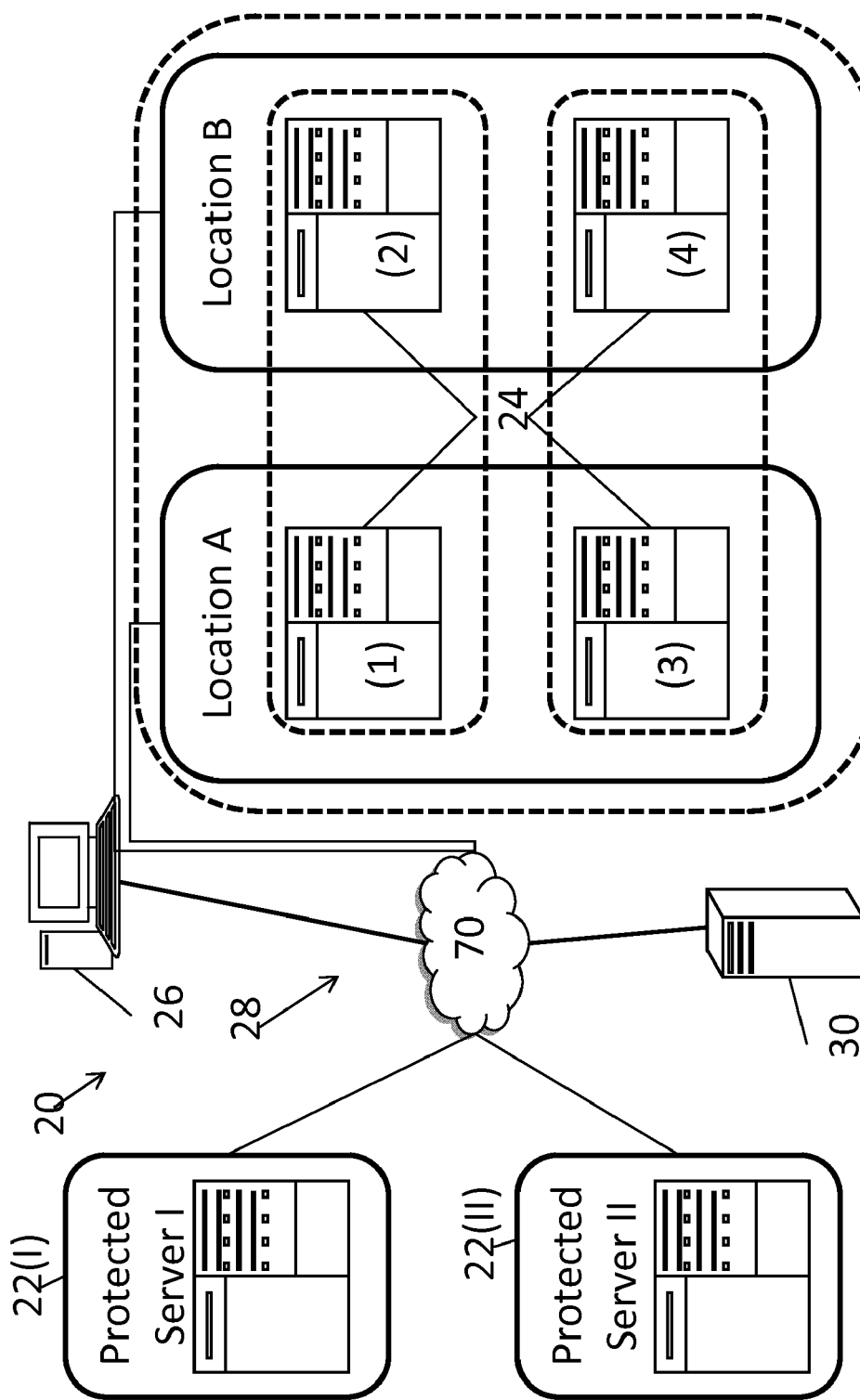
FIG. 1 is a block diagram of an electronic environment suitable for the improved technique of relocating data between source and target chains.

FIG. 1 shows an electronic environment 20 which is suitable for use by the improved technique. The electronic environment 20 includes agents 22, storage nodes 24, a provider apparatus 26, a communications medium 28, and a database system 30. Agents 22 are connected to storage nodes 24 through communications medium 28. Agent 22 typically resides in a location remote from any of the storage nodes.

The communications medium 28 conveys electronic communications 70 between the various components of the electronic environment 20. The communications medium 28 is illustrated as a cloud because it is capable of having a variety of topologies including hub-and-spoke, backbone, loop, irregular, a combination of the Internet and LAN(s), combinations thereof, and so on.

Storage nodes 24 (or "vaults") are storage platforms which include a front-end computer and a disk array (e.g., an array of magnetic disk drives). Individual storage nodes are labeled 24(i), where i is an index representing a particular storage node. Storage nodes 24 form a storage grid 40. At least some storage nodes can be chained together within storage grid 40 to provide storage redundancy, e.g. data mirroring.

Agents 22 have data in the form of one or more policies. A policy specifies, among other things, folders and/or files to be protected, a time interval for protecting new changes and a duration for which the data should be protected. Thus, for each policy, there are typically multiple versions, where the number of versions associated with a policy is determined by the time interval and duration. Also, each policy may further specify that different versions be coalesced into a single version at either a specified time interval or according to another criterion. A similar technique is described, for example, in U.S. Ser. No. 12/711,413, entitled "DATA RESTORATION UTILIZING FORWARD AND BACKWARD DELTAS", the teachings of which are hereby incorporated by reference in their entirety.

The provider apparatus 26 is a specialized device which is constructed and arranged to perform the task of assigning a particular storage node 24 of the storage grid 40 to an agent 22 (e.g., the agent 22(1)) when the agent 22 requests a storage location to backup a policy. As shown in FIG. 2, the provider apparatus 26 includes an electronic interface 27 and an electronic controller 29. In some arrangements, the electronic controller 29 includes a microprocessor and memory which are configured to receive a specialized application from a computer program product 60 through electronic interface 27. When the electronic controller 29 executes the specialized application, the provider apparatus 26 is equipped to robustly and reliably assign storage nodes 24 to the agents 22 for policy backups.

Database system 30 is a device configured to store information related to the storage nodes 24. As illustrated in FIG. 3, database system 30, maintained by provider apparatus 26, stores a database 31. Database 31 is constructed and arranged to store storage node entries, e.g., storage node entries 32, 34, 36, and 38, which correspond to, for example, storage nodes 24(1), 24(2), 24(3), and 24(4), respectively. Each storage node entry contains a collection of storage node information characterizing an ability of each storage node to accept a policy from an agent.

A collection of storage information that is found in, for example, database 31, is illustrated in FIG. 3. The collection of storage node information, for each storage node of the storage grid, includes (a) how many backup policies currently exist on that storage node, (b) a percentage of continuous backup policies vs. scheduled policies residing on that storage node, (c) how many versions exist on that storage node, (d) whether there is another policy being moved to that storage node, (e) how much total storage capacity exists on that storage node, (f) how much available storage capacity exists on that storage node, (g) whether that storage node forms part of a storage chain which mirrors data with another storage node and, if so, whether the storage chain is disabled, and (h) whether new backup policies have already been assigned to that storage node but that are not currently present on that storage node and, if so, what the anticipated storage requirements are for those new backup policies. It should be understood that a continuous backup policy is one that is automatically backed up every, say, 15 minutes. In contrast, a scheduled backup policy is one that is backed up at specific times during the week (i.e., the users specifies when and how often). The collection of storage node information may include other data as well.

During operation, the provider apparatus 26 assigns a storage node 24 (e.g., the node 24(1)) from the storage grid 40 to an agent 22. Along these lines, the controller 29 receives an assignment request from the agent 22 through the electronic interface 27. Additionally, the controller 29 obtains, from the agent 22, an available amount indicating a total available storage space amount on the agent 22, a used amount indicating an amount of storage space consumed by the policy stored on the agent 22, and a policy type indicating a particular type of the policy among multiple types. In some arrangements, the assignment request includes this information. In other arrangements, the controller 29 queries the agent 22 for this information in response to the assignment request. The controller 29 may acquire other data from the agent 22 as well as and is preferably updated in real time.

It should be understood that different policy types may impose different storage requirements. For example, if a policy is a "standard" type, the provider apparatus 26 considers the policy to include traditional files and folders and thus places significance on the agent's storage capacity.

However, if a policy is a "DPM" type, the provider apparatus 26 considers the policy to include a Microsoft Data Protection Manager (DPM) replica. For such a type, data storage is raw disk space and is not reported as part of the agent's storage capacity. In some arrangements, the provider apparatus 26 imposes a default amount of required storage space (e.g., 1 TB) for a DPM backup policy. In other arrangements, if an actual amount of storage space is available, the required storage space is based upon the actual amount.

It should be understood that the information within the database 31 is updated routinely. In some arrangements, the controller 29 of the provider apparatus 26 (or database 31 itself) polls the storage nodes 24 for current operating status data and updates the storage node information within the database 31 (e.g., periodically, after changes occur within the nodes 24, etc.). In other arrangements, the storage nodes 24 are configured to directly update the storage node information within the database 31 (e.g., periodically, after changes occur within the nodes 24, etc.). In yet other arrangements, the agents 22 or one or more other external devices update the storage node information within the database 31.

Next, in response to the assignment request, the controller 29 selects a particular storage node 24 from the multiple storage nodes 24 of the storage grid 40 based on an assessment that takes into account the following: an available amount of storage space of the particular storage node 24 in the storage grid 40, an amount of space on agent 22 used by the policy, the policy type, and the collection of storage node information corresponding to the particular storage node.

For example, controller 29 examines the number of versions that exist on the particular storage node 24. This information is available on, for instance, database 31 as illustrated in FIG. 3. Controller 29 then compares this number of versions for the particular storage node 24 to, say, a predefined maximum number of versions permitted to be stored on the particular storage node 24.

In a further example, controller 29 examines the number of continuous backup policies (available, for example, on database 31 as illustrated in FIG. 3) currently stored on the particular storage node 24, and increments the current number of continuous policies to get a potential number of continuous policies to be allocated onto the particular storage node 24. The potential number of continuous policies to be allocated is compared with a predefined maximum number of continuous backup policies permitted for the particular storage node 24.

In a further example, controller 29 examines whether multiple policies on agent 22 are permitted to be backed up by the particular storage node 24. In this regard, a load balancing setting is included in the storage space requirements of the policy. That is, when the load balance setting identifies that multiple policies on agent 22 are not permitted to be backed up to the same storage node, controller 29 detects whether the particular storage node 24 is already assigned to backup another policy stored on agent 22 to determine whether to assign the particular storage node 24 to backup the policy stored on agent 22.

In a still further example, controller 29 performs a comparison of the amount of space used by the policy with the available amount of storage space on the particular storage node 24. Because of the dynamic nature of the storage space on agent 22 used by a policy, controller 29 preferably makes a projected estimate of storage space requirements for the policy over a period of time in determining whether to allocate space on a particular storage node 24. For example, controller 29 may multiply a current amount of storage occupied by the policy on agent 22 by a growth rate factor to generate the projected estimate. The growth rate factor is typically a value which increases the current amount of storage space occupied by the policy on agent 22 by a predefined percentage (e.g., 15%, 50%, 75%, 100%).

Controller 29 would then compare such a projected estimate with the available amount of storage space on the particular storage node 24. For example, controller 29 computes the following quantity:

AdjustedAvailableVaultSpace=AvailableVaultDisk−
((TotalVaultDisk*Critical Percentage)+Rented-
Space)

where AvailableVaultDisk is the amount of disk space available on the particular storage node 24 for storage of the policy, TotalVaultDisk is the amount of physical space on the particular storage node 24, Critical Percentage is the percentage of the TotalVaultDisk that is not available to store backup data from any policies, and RentedSpace is the amount of space currently allocated for storage of other policies that have not yet completed a successful backup to the storage device. Controller 29 would compare the quantity AdjustedAvailableVaultSpace with a projected amount of space to be required by the policy on agent 22.

In some arrangements, the controller 29 applies a set of algorithms or rules to make the selection. The table illustrated in FIG. 4 shows a particular scheme for assessing whether to assign a particular storage node 24 to a policy stored on agent 22 for backup. In the scheme, the collection of storage node information that is analyzed by controller 29 is quantified according to the table 42 in FIG. 4. A best-fit value is assigned to a particular state representing a violation of a condition, such as exceeding the maximum number of policies. In some arrangements, a storage node having a best-fit value exceeding a predefined value (e.g., 0×3F) is considered unavailable for assignment.

The controller 29 then allocates the particular storage node 24 to the agent 22 to backup the policy stored on the agent 22. Once the allocation is made, controller 29 notifies agent 22 of the assignment so that a backup of the policy from agent 22 to storage node 24 may proceed. Storage space resources for the particular node 24 can then be adjusted to account for the new assignment. In some implementations, database 31 is also updated to account for the new assignment.

Figure 5:
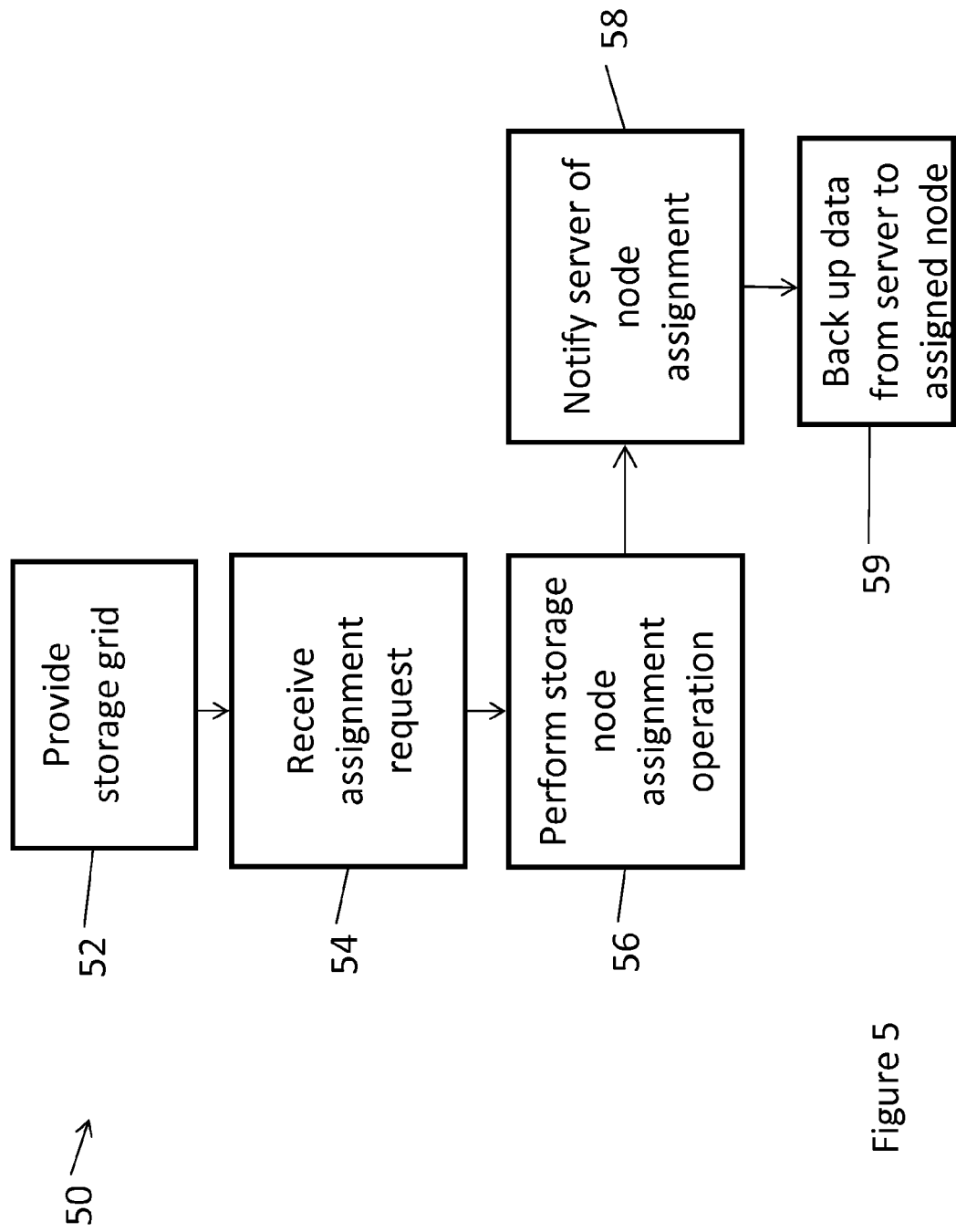
FIG. 5 is a flow chart of a method for assigning a storage node to a policy.

A method 50 of assigning a storage node from a storage grid to an agent is illustrated in FIG. 5. A storage grid is defined 52 by a set of storage nodes. A request to assign a backup of a policy to a storage node within the storage grid is received 54 by, for example, an electronic controller. An operation of assigning the backup of the policy to a storage node is performed 56 by, say, the controller. Once the operation has been performed and the assignment has been made, the agent is notified 58 of the assignment. Data may then be backed up 59 from the agent to the storage node chosen for the backup.

The storage grid is defined 52 to include storage nodes that may, for example, form a storage chain. A set of storage nodes can be chained together to provide redundancy or data mirroring. The storage nodes in the storage grid are connected to, say, an electronic controller and an agent containing a policy to be back up through a communications medium.

The controller receives 54 a request from an agent to assign a backup of a policy to a storage node within the storage grid. The request is received 54 over the communications medium, the communications medium connecting the controller with the agent.

Once the request is received, the controller then performs 56 the assignment of the backup of the policy to one of the storage nodes within the storage grid. The assignment is based upon an assessment of various state values within both the agent and a particular storage node. The assessment considers both storage space requirements of the policy stored on the agent and available storage space resources of the particular storage node. Details concerning the storage space requirements of the policy and available space on a particular storage node are described above.

Once the storage node has been assigned, the controller then notifies 58 the agent of the assignment. The notification takes place through the electronic communications medium connecting the agent and the storage nodes within the storage grid to the controller.

Once the agent has been notified of the assignment, the backing up 59 of the policy on the agent to the assigned storage node commences.

Such smart assignment of a storage node 24 to an agent 22 enables efficient utilization of the storage nodes 24 (e.g., when performing backup operations for multiple agents 22 and policies). Additionally, such assignment simplifies the management of the storage grid 40 and is able to occur automatically and in a consistent manner with little or no manual involvement.

While various embodiments of the invention have been particularly shown and described, it will be understood by those skilled in the art that various changes in form and details may be made therein without departing from the spirit and scope of the invention as defined by the appended claims.

For example, it should be understood that the provider apparatus 26 may reside on a dedicated device. Alternatively, the provider apparatus 26 may form part of a server, a storage node, or another apparatus which performs other operations.

Additionally, it should be understood that each storage node 24 is capable of backing up multiple policies stored on multiple agents 22. Similarly, each agent 22 is capable of storing multiple policies which are backed up on one or more storage nodes 24.

Furthermore, it should be understood that some embodiments are directed to an electronic backup environment which utilizes intelligent backup storage node assignments. Some embodiments are directed to a storage provider infrastructure (e.g., a provider apparatus 26 in combination with a storage grid 40) which performs intelligent backup storage node assignments. Some embodiments are directed to an apparatus or device which performs intelligent backup storage node assignments. Some embodiments are directed to a process of performing intelligent backup storage node assignments. Also, some embodiments are directed to a computer program product which enables computer logic to perform intelligent backup storage node assignments.

In some arrangements, provider apparatus 26 is implemented by a set of processors or other types of control/processing circuitry running software. In such arrangements, the software instructions can be delivered to electronic controller 29 in the form of a computer program product 60 (illustrated generally by a diskette icon 60 in FIG. 2) having a computer readable storage medium which stores the instructions in a non-volatile manner. Examples of suitable computer readable storage media include tangible articles of manufacture and apparatus such as CD-ROM, flash memory, disk memory, tape memory, and the like.

What is claimed is:

1. A computer-implemented method of assigning a storage node from a storage grid to a server, the storage grid including multiple storage nodes capable of backing up a policy stored on the server, the computer-implemented method comprising:

receiving an assignment request which requests assignment of one of the multiple storage nodes of the storage grid to the server to backup the policy stored on the server;

performing a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid, wherein the storage space requirements of the policy include an amount storage space occupied by the policy on the server, and wherein the available storage space resources of the storage grid include an amount of free storage space available on the multiple storage nodes; and notifying the server of the assignment result to effectuate backing up of the policy stored on the server by the storage node.

2. A computer-implemented method as in claim 1 wherein performing the storage node assignment operation in the automated manner in response to the assignment request includes:

performing a comparison of the storage space requirements of the policy with available storage space resources of a particular storage node to generate the assessment of storage space requirements of the policy and available storage space resources of the storage grid.

3. A computer-implemented method as in claim 2 wherein the storage space requirements of the policy includes a current amount of storage space currently occupied by the policy on the server;

wherein the available storage space resources of the particular storage node includes a current amount of free storage space currently available on the particular storage node; and wherein comparing the storage space requirements of the policy with available storage space resources of the particular storage node includes (i) multiplying the current amount of storage space currently occupied by the policy on the server by a growth rate factor to generate a future amount of storage space projected to be occupied by the policy on the server at a future point in time, and (ii) comparing the future amount of storage space projected to be occupied by the policy on the server to the current amount of free storage space currently available on the particular storage node to determine whether to assign the particular storage node to backup the policy stored on the server.

4. A computer-implemented method as in claim 3, further comprising:

prior to comparing the storage space requirements of the policy with the available storage space resources of the particular storage node, setting the growth rate factor to be a value which increases the current amount of storage space currently occupied by the policy on the server by a predefined percentage to provide the future amount of storage space projected to be occupied by the policy on the server at the future point in time.

5. A computer-implemented method as in claim 3 wherein the storage space requirements of the policy further includes a backup frequency;

wherein the available storage space resources of the particular storage node further includes a current number of versions associated with the particular storage node; and wherein comparing the storage space requirements of the policy with available storage space resources of the particular storage node further includes (i) increasing the current number of versions by a particular number of versions based on the backup frequency to provide a potential number of versions, and (ii) comparing the potential number of versions to a predefined maximum number of versions permitted for the particular storage node to determine whether to assign the particular storage node to backup the policy stored on the server.

6. A computer-implemented method as in claim 3 wherein the storage space requirements of the policy further includes a backup type setting, the backup type setting identifying one of a "continuous" backup type in which a policy backup operation is to be performed every 15 minutes and a "scheduled" backup type in which a policy backup operation is to be performed at user-specified intervals;

wherein the available storage space resources of the particular storage node further includes a current number of "continuous" backup type policies assigned to the storage node; and wherein comparing the storage space requirements of the policy with available storage space resources of the particular storage node further includes, only when the backup type setting identifies the "continuous" backup type, (i) incrementing the current number of "continuous" backup type policies currently assigned to the particular storage node to provide a potential number "continuous" backup type policies assigned to the particular storage node, and (ii) comparing the potential number of "continuous" backup type policies assigned to the storage node to a predefined maximum number of "continuous" backup type policies permitted for the particular storage node to determine whether to assign the particular storage node to backup the policy stored on the server.

7. A computer-implemented method as in claim 3 wherein the storage space requirements of the policy further includes a load balance setting, the load balance setting identifying whether multiple policies on the server are permitted to be backed up to a same storage node; and wherein comparing the storage space requirements of the policy with available storage space resources of the particular storage node further includes, when the load balance setting identifies that multiple policies on the server are not permitted to be backed up to the same storage node, detecting whether the particular storage node is already assigned to backup another policy stored on the server to determine whether to assign the particular storage node to backup the policy stored on the server.

8. A computer-implemented method as in claim 3, further comprising:

after assigning the particular storage node to backup the policy stored on the server, adjusting the available storage space resources of the particular storage node to account for assignment of the particular storage node to backup the policy stored on the server.

9. A computer-implemented method as in claim 8 further comprising:

prior to receiving the assignment request, establishing a storage grid database which stores storage node entries, each storage node entry (i) corresponding to a storage node of the storage grid, (ii) identifying currently available storage space resources for that storage node, and (iii) imposing assignment restrictions for that storage node; and dynamically updating the storage node entries of the storage grid database to account for new storage node assignments.

10. A computer-implemented method as in claim 2 wherein the storage space requirements of the policy includes a total amount of storage space currently available to the policy on the server;

wherein the available storage space resources of the particular storage node includes a current amount of free storage space currently available on the particular storage node and a current amount of allocated storage space on the particular storage node; and wherein comparing the storage space requirements of the policy with available storage space resources of the particular storage node includes (i) subtracting the current amount of allocated storage space on the particular storage node from the current amount of free storage space currently available on the particular storage node to provide an amount of non-allocated storage space on the particular storage node, and (ii) comparing the total amount of storage space currently available to the policy on the server with the amount of non-allocated storage space on the particular storage node to determine whether to assign the particular storage node to backup the policy stored on the server.

11. An electronic apparatus to assign a storage node from a storage grid to a server, the storage grid including multiple storage nodes capable of backing up a policy stored on the server, the electronic apparatus comprising:

a network interface; and a control circuit coupled to the network interface, the control circuit being constructed and arranged to receive, through the network interface, an assignment request which requests assignment of one of the multiple storage nodes of the storage grid to the server to backup the policy stored on the server, perform a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid, wherein the storage space requirements of the policy include an amount of storage space occupied by the policy on the server, and wherein the available storage space resources of the storage grid include an amount of free storage space available on the multiple storage nodes, and notify the server, through the network interface, of the assignment result to effectuate backing up of the policy stored on the server by the storage node.

12. An electronic apparatus as in claim 11 wherein the control circuit, when performing the storage node assignment operation in the automated manner in response to the assignment request, is constructed and arranged to:

perform a comparison of the storage space requirements of the policy with available storage space resources of a particular storage node to generate the assessment of storage space requirements of the policy and available storage space resources of the storage grid.

13. An electronic apparatus as in claim 12 wherein the storage space requirements of the policy includes a current amount of storage space currently occupied by the policy on the server;

wherein the available storage space resources of the particular storage node includes a current amount of free storage space currently available on the particular storage node; and wherein the control circuit, when comparing the storage space requirements of the policy with available storage space resources of the particular storage node, is constructed and arranged to (i) multiply the current amount of storage space currently occupied by the policy on the server by a growth rate factor to generate a future amount of storage space projected to be occupied by the policy on the server at a future point in time, and (ii) compare the future amount of storage space projected to be occupied by the policy on the server to the current amount of free storage space currently available on the particular storage node to determine whether to assign the particular storage node to backup the policy stored on the server.

14. An electronic apparatus as in claim 13 wherein the control circuit is further constructed and arranged to:

after assigning the particular storage node to backup the policy stored on the server, adjust the available storage space resources of the particular storage node to account for assignment of the particular storage node to backup the policy stored on the server.

15. An electronic apparatus as in claim 12 wherein the storage space requirements of the policy includes a total amount of storage space currently available to the policy on the server;

wherein the available storage space resources of the particular storage node includes a current amount of free storage space currently available on the particular storage node and a current amount of allocated storage space on the particular storage node; and wherein the control circuit, when comparing the storage space requirements of the policy with available storage space resources of the particular storage node, is constructed and arranged to (i) subtract the current amount of allocated storage space on the particular storage node from the current amount of free storage space currently available on the particular storage node to provide an amount of non-allocated storage space on the particular storage node, and (ii) compare the total amount of storage space currently available to the policy on the server with the amount of non-allocated storage space on the particular storage node to determine whether to assign the particular storage node to backup the policy stored on the server.

16. A computer program product which includes a non-transitory computer readable storage medium storing code that, when executed by a computer, causes the computer to assign a storage node from a storage grid to a server, the storage grid including multiple storage nodes capable of backing up a policy stored on the server, the code including:

instructions to receive an assignment request which requests assignment of one of the multiple storage nodes of the storage grid to the server to backup the policy stored on the server, instructions to perform a storage node assignment operation in an automated manner in response to the assignment request, the storage node assignment operation providing an assignment result identifying a storage node assigned to backup the policy stored on the server, the assignment result being based on an assessment of storage space requirements of the policy and available storage space resources of the storage grid, wherein the storage space requirements of the policy include an amount of storage space occupied by the policy on the server, and wherein the available storage space resources of the storage grid include an amount of free storage space available on the multiple storage nodes, and instructions to notify the server of the assignment result to effectuate backing up of the policy stored on the server by the storage node.

17. A computer program product as in claim 16 wherein the instructions to perform the storage node assignment operation in the automated manner in response to the assignment request include:
- instructions to perform a comparison of the storage space requirements of the policy with available storage space resources of a particular storage node to generate the assessment of storage space requirements of the policy and available storage space resources of the storage grid.

18. A computer program product as in claim 17 wherein the storage space requirements of the policy includes a current amount of storage space currently occupied by the policy on the server;
- wherein the available storage space resources of the particular storage node includes a current amount of free storage space currently available on the particular storage node; and
- wherein the instructions to compare the storage space requirements of the policy with available storage space resources of the particular storage node include (i) instructions to multiply the current amount of storage space currently occupied by the policy on the server by a growth rate factor to generate a future amount of storage space projected to be occupied by the policy on the server at a future point in time, and (ii) instructions to compare the future amount of storage space projected to be occupied by the policy on the server to the current amount of free storage space currently available on the particular storage node to determine whether to assign the particular storage node to backup the policy stored on the server.

19. A computer program product as in claim 18 wherein the code further includes:
- instructions to adjust the available storage space resources of the particular storage node to account for assignment of the particular storage node to backup the policy stored on the server after the particular storage node is assigned to backup the policy stored on the server.

20. A computer program product as in claim 17 wherein the storage space requirements of the policy includes a total amount of storage space currently available to the policy on the server;
- wherein the available storage space resources of the particular storage node includes a current amount of free storage space currently available on the particular storage node and a current amount of allocated storage space on the particular storage node; and
- wherein the instructions to compare the storage space requirements of the policy with available storage space resources of the particular storage node include (i) instructions to subtract the current amount of allocated storage space on the particular storage node from the current amount of free storage space currently available on the particular storage node to provide an amount of non-allocated storage space on the particular storage node, and (ii) instructions to compare the total amount of storage space currently available to the policy on the server with the amount of non-allocated storage space on the particular storage node to determine whether to assign the particular storage node to backup the policy stored on the server.

* * * * *